G. P. ARTHUR.
COTTON CHOPPER.
APPLICATION FILED SEPT. 16, 1909.
951,876.
Patented Mar. 15, 1910.
2 SHEETS—SHEET 1.
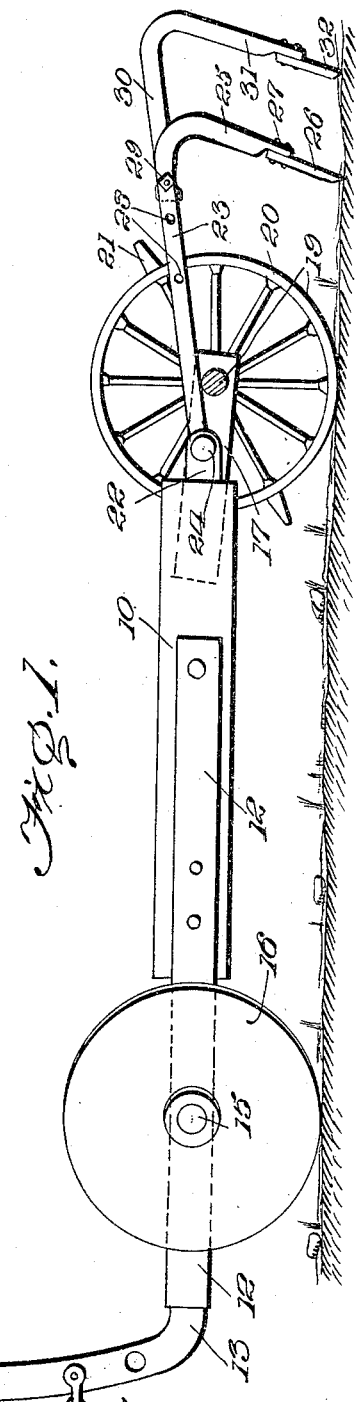
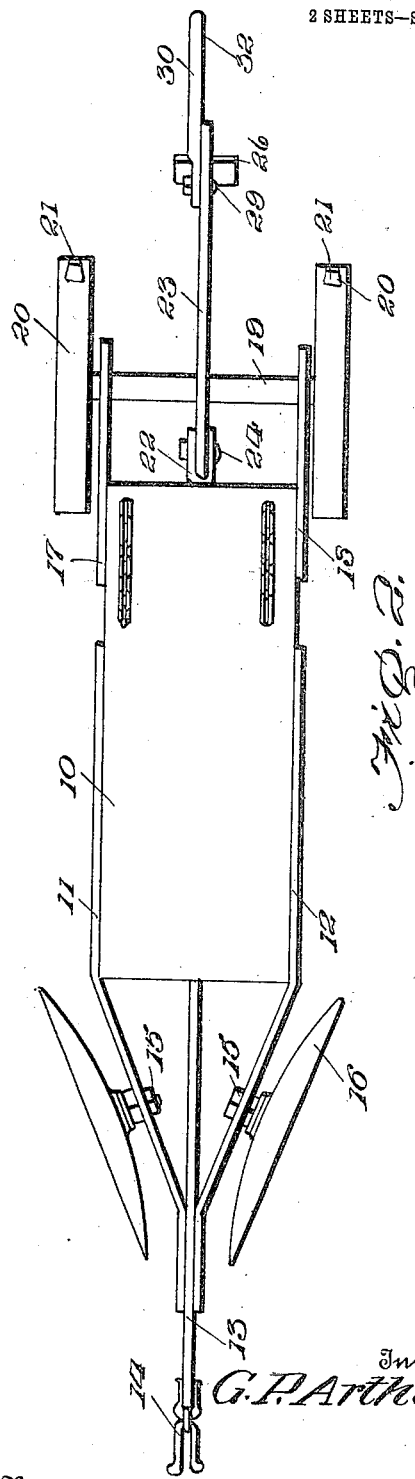

G. P. ARTHUR.
COTTON CHOPPER.
APPLICATION FILED SEPT. 16, 1909.
951,876.
Patented Mar. 15, 1910.
2 SHEETS—SHEET 2.
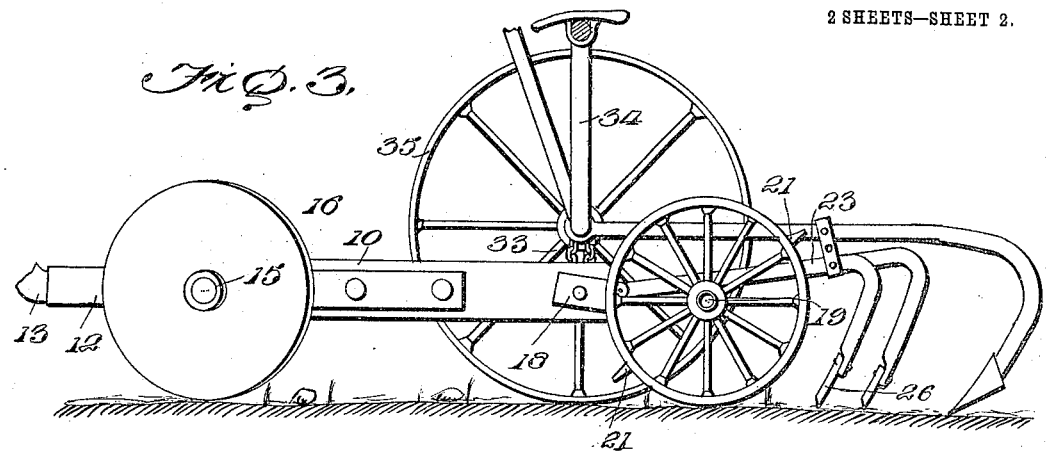
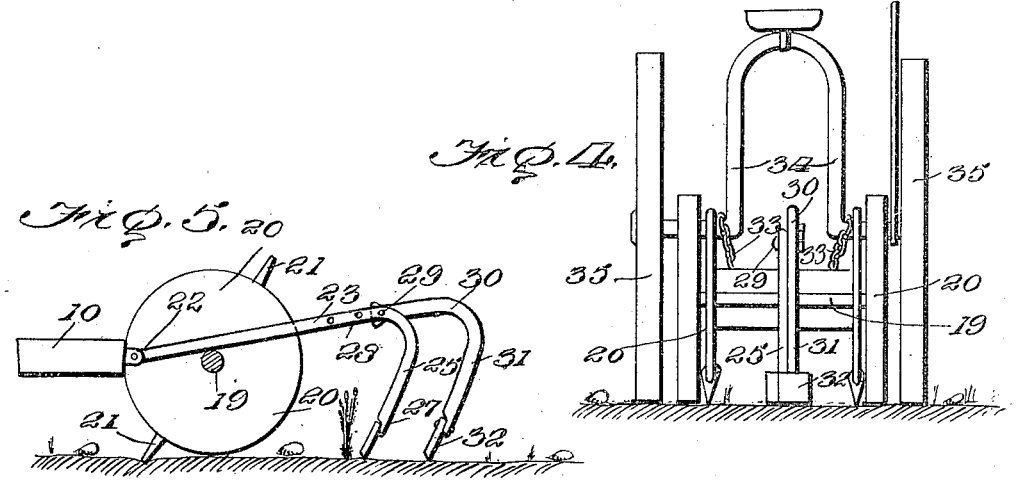
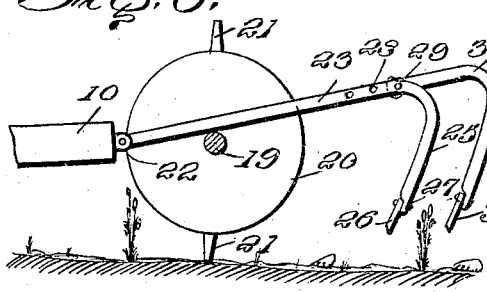
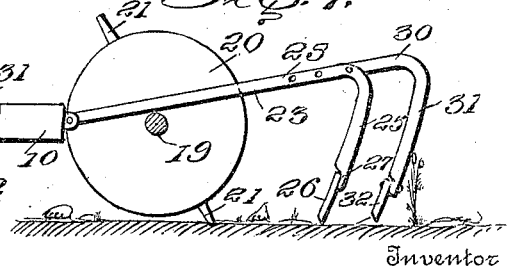
Witnesses
W. T. Woodson
Juana M. Fallin
Inventor
G. P. Arthur
By
W. H. Macey, Attorneys

UNITED STATES PATENT OFFICE.

GEORGE P. ARTHUR, OF MIDLAND, TEXAS.

COTTON-CHOPPER.

951,876.  Specification of Letters Patent.  Patented Mar. 15, 1910.

Application filed September 16, 1909. Serial No. 518,077.

*To all whom it may concern:*

Be it known that I, GEORGE P. ARTHUR, citizen of the United States, residing at Midland, in the county of Midland and State of Texas, have invented certain new and useful Improvements in Cotton-Choppers, of which the following is a specification.

This invention relates to choppers, and has special reference to an implement to be used in the cultivation of cotton.

An object of this invention is to provide an implement of this character which may be connected to a cultivator of common formation and can be drawn therewith over rows of cotton so that the disks upon the implement throw the loose dirt from the rows to admit of the free action of the choppers of the implement upon the plants in the row. The implement provides means whereby plants are left standing at predetermined and equidistantly spaced intervals in the rows, while the shovels of the cultivator to which the implement is attached, gather the cut stalks into hills.

The invention has for another object the provision of a mechanism employed with the implement for raising the choppers out of engagement with the ground and over the plants when the same come to a point adjacent the plant, the mechanism being automatically operated during the movement of the implement.

The invention has for a still further object the provision of a device of this character which is of comparatively simple structure and which occupies but small space so that the same may be attached beneath the cultivator and between the shovel beams of the same.

For a full understanding of the invention and the merits thereof, and also to acquire a knowledge of the details of construction and the means for effecting the result, reference is to be had to the following description and accompanying drawings, in which;

Figure 1 is a side elevation of the improved implement, parts of the same being disclosed in section; Fig. 2 is a top plan view of the same; Fig. 3 is a side elevation of the improved implement as applied to a cultivator, a fragmentary view of the cultivator being disclosed; Fig. 4 is a rear elevation of Fig. 3; Fig. 5 is a detailed side elevational view of the rear end of the improved chopper, the same being disclosed as about to pass over a young plant; Fig. 6 is a view of the same disclosing the device as passing over the plant; and Fig. 7 is a view of the same showing the chopper after passing over the plant.

Corresponding and like parts are referred to in the following description and indicated in all the views of the accompanying drawings by the same reference characters.

Referring to the drawings in which is disclosed an embodiment of the invention, the numeral 10 designates a beam which forms the body portion of the implement and which is provided at its opposite sides with bars 11 and 12 extended forwardly from the beam 10 and converged where their outer extremities are engaged with the tongue 13 interposed between the forward ends of the beams 11 and 12 and curved upwardly to adjustably support a clevis 14 or the like by means of which the implement is adapted to be secured to a cultivator tongue. The side bars 10 and 11 are formed of flat strips of metal and are apertured adjacent their forward ends, at their oblique portions for the reception of spindles 15 which extend upwardly therefrom and support a pair of disks 16. The disks 16 are therefore disposed diagonally with respect to the axis of the implement in the usual manner and are employed for the purpose of raising the earth about the hills and of drawing the same to the sides of the device. It will be noted from this construction that the forward edges of the disks are spaced apart in order to permit of the hills passing between the same and to prevent injury to the young plants which are placed in the hills.

The rear extremity of the beam 10 is provided with braces 17 and 18 which are secured to the opposite sides of the beam 10 and extended rearwardly therefrom, the same being disposed in parallel and apertured for the reception of a transverse shaft 19 engaged through their rear extremities. Keyed to the opposite ends of the shaft 19 are traction wheels 20 which are provided with blocks 21 spaced apart in the peripheries of the wheels in registered relation and at predetermined intervals. The blocks 21 are employed for the purpose of raising the traction wheels 20 when the blocks 21 are brought into engagement with the ground, the raising of the wheels being effected for a purpose hereinafter set forth. From an intermediate portion of the rear end of the beam 10 ears 22 are extended which are disposed in parallel and pivotally support between the same a chopper beam 23 by means of the transverse bolt 24 which is extended through the ears 22 and loosely engaged with the beam 23. The rear end of the chopper beam 23 is curved downwardly to form a foot 25 upon which is secured a chopper 26, the same being secured to the foot 25 by the flattening of the lower extremity of the foot and of the engagement of the chopper 26 against the flattened portion by means of bolts 27 or the like. The chopper beam 23 is provided with a plurality of apertures 28 for the reception of a clamping bolt 29 which carries the forward flattened extremity of an auxiliary chopper beam 30 rearwardly extended from the beam 23 and curved downwardly at its rear extremity to form a secondary foot 31 upon which is secured a secondary chopper 32. The auxiliary beam 30 is so curved as to dispose the foot 31 and chopper 32 in the same longitudinal plane with the foot 25 and chopper 26. The apertures 28 are employed for the purpose of adjusting the extension of the beam 30 from the beam 23 so as to adjust the distance between the choppers 26 and 32.

The beam 10 is provided adjacent its rear extremity and upon its upper face with chains 33 which are engaged about the lower ends of the arched axle 34 of a cultivator by means of which the beam 10 is supported thereon and retained in longitudinal alinement with the cultivator, the wheels 20 of the chopper being disposed inwardly and adjacent the wheels 35 of the cultivator, the chopper wheels being positioned rearwardly while distanced from the cultivator wheels.

In the use of the implement, when the same is attached to a cultivator the tongue 13 of the chopper is suitably secured to the forward end of the cultivator, preferably to the tongue of the same by means of a chain, rods, or any other suitable connecting mechanism. The chains 33 of the chopper are engaged over the out-turned portions of the arched axle 34 of the cultivator whereby the beam 10 is retained directly beneath the cultivator and prevented from lateral swinging relative thereto. Normally the chopper beam 23 rests upon the transverse axle 19 and extends rearwardly thereof where the choppers 26 and 32 are permitted to rest upon the ground. The device when moving rotates the traction wheels 20 and causes the striking of the blocks 21 upon the ground whereby the wheels are raised upwardly and carry the rear end of the chopper and to thereby raise the chopper beam 23 by reason of its engagement upon the axle 19, to lift the choppers 26 and 32 from engagement with the ground.

In Fig. 5 it will be noted that the wheel 20 is so disposed that the block 21 is in engagement with the ground and is in position to raise the same upon further movement of the implement. As the implement is moved forwardly the same assumes the position disclosed in Fig. 6 where the blocks 21 are supporting the wheels 20 upwardly and the chopper beam 23 is in a raised position in order to clear the choppers 26 and 32 from the young plant disclosed. It will be noted from Figs. 5 and 7, the latter showing the implement after having passed over the young plant, that the chopper 26 rises at a point adjacent the plant and is dropped to the ground at a point considerably beyond the opposite side of the plant, whereby the chopper is not in operation upon the ground during the distance traveled over from the plant to the point of contact with the ground. For this reason the auxiliary beam 30 is employed which extends backwardly and which causes the raising of the chopper 32 simultaneously with the chopper 26 but at a distance rearwardly of the young plant whereby the chopper 32 is dropped into engagement with the ground immediately in front of the plant thereby acting upon the ground the distance over which the chopper 26 fails to pass. The chopper 32 is disclosed in Fig. 5 as about to leave the ground at a distance rearwardly of the plant and is disclosed in Fig. 7 after contacting with the ground immediately in front of the plant. The space not acted upon by the choppers 26 and 32 can be regulated by the extension of the auxiliary beam 30 rearwardly from the chopper beam 23 by reason of the provision of the apertures 28 in the beam 23 in order to dispose the clamping bolt 29 in the adjusted position.

Having thus described the invention, what is claimed as new is:—

1. An implement including a beam, braces rearwardly extended from said beam, a transverse shaft mounted in said braces, wheels keyed to said shaft at the opposite ends thereof, blocks secured to the peripheries of the said wheels in spaced relation, a chopper beam pivoted upon said main beam and extended rearwardly therefrom, said chopper beam being engaged upon said transverse shaft, an auxiliary beam adjustably positioned upon said chopper beam, and extended rearwardly therefrom, and choppers disposed upon the lower ends of said chopper beam and said auxiliary beam.

2. An implement including a beam, a transverse shaft carried by the rear end of said beam, a chopper beam pivotally mounted on said first beam, and engaged with said shaft, traction wheels keyed to the opposite ends of said shaft, blocks mounted in the peripheries of said traction wheels for raising the same at times and choppers carried upon the rear extermities of said pivoted beam.

3. An implement including a beam, side bars forwardly extended from said beam, and converged at their forward ends, a tongue interposed between the forward ends of said side bars, braces rearwardly extended from said side beam, a transverse shaft carried by said braces, a pair of ears rearwardly extended from the intermediate portion of said beam, at the end thereof, a chopper beam pivotally engaged between said ears, a foot formed upon said chopper beam, a chopper carried by said foot, said chopper beam having a plurality of apertures formed therein, an auxiliary beam carried by said chopper beam and rearwardly extended therefrom, a secondary foot carried by said auxiliary beam, and a second chopper mounted on said secondary foot.

4. An implement including a body portion, disks disposed in spaced relation and in diagonal alinement at the forward end of said body portion, a transverse shaft located at the rear end of said body portion, wheels keyed to the opposite ends of said shaft, a chopper beam pivotally mounted on said body portion and rearwardly extended therefrom, a secondary beam rearwardly extended from said first beam, choppers carried by said beams and means disposed upon said body portion for raising said beams at times to lift said choppers over young plants during the employment of the implement.

In testimony whereof I affix my signature in presence of two witnesses.

GEORGE P. ARTHUR. [L. S.]

Witnesses:
 GEO. W. FOWLER,
 T. F. SMALLING.